(12) United States Patent
Park

(10) Patent No.: US 12,130,838 B2
(45) Date of Patent: Oct. 29, 2024

(54) HIERARCHICAL UNIVERSAL RESOLVER SYSTEM FOR DECENTRALIZED IDENTITY ENVIRONMENT AND METHOD THEREOF

(71) Applicant: K4-security.co.,Ltd., Seoul (KR)

(72) Inventor: Kyoung Chul Park, Gimpo-si (KR)

(73) Assignee: K4-security.co., Ltd., Seoul (KR)

( * ) Notice: Subject to any disclaimer, the term of this patent is extended or adjusted under 35 U.S.C. 154(b) by 0 days.

(21) Appl. No.: 18/176,552

(22) Filed: Mar. 1, 2023

(65) Prior Publication Data
US 2023/0350920 A1    Nov. 2, 2023

(30) Foreign Application Priority Data

Apr. 29, 2022  (KR) .................. 10-2022-0053754

(51) Int. Cl.
G06F 16/28    (2019.01)
(52) U.S. Cl.
CPC .......... G06F 16/282 (2019.01); G06F 16/288 (2019.01)
(58) Field of Classification Search
None
See application file for complete search history.

(56) References Cited

U.S. PATENT DOCUMENTS

| | | | |
|---|---|---|---|
| 2010/0299759 A1* | 11/2010 | Kim .................. | G06F 21/10 726/28 |
| 2018/0275881 A1* | 9/2018 | Ashraf ................ | G06F 3/061 |
| 2018/0343126 A1* | 11/2018 | Fallah ................ | H04L 9/3297 |
| 2020/0389462 A1 | 12/2020 | Murdoch et al. | |
| 2021/0067340 A1 | 3/2021 | Ferenczi et al. | |
| 2021/0256505 A1 | 8/2021 | Yujun | |
| 2021/0327008 A1* | 10/2021 | Salah ................. | G06F 8/38 |
| 2021/0379425 A1* | 12/2021 | Tran .................. | A62B 23/06 |

FOREIGN PATENT DOCUMENTS

| | | |
|---|---|---|
| EP | 3688634 B1 | 2/2022 |
| WO | 2021/034384 A1 | 2/2021 |

OTHER PUBLICATIONS

"Office Action for KR Application No. 10-2022-0053754", Jun. 8, 2023, KIPO, Korea.
Martin Schaffner, "Analysis and evaluation of Blockchain-based self-sovereign identity systems", Technical University of Munich: Munich, Nov. 12, 2019, Germany.
Markus Sabadello, "A Universal Resolver for self-sovereign identifiers on any blockchain or other decentralized system", Decentralized Identity Foundation, Nov. 1, 2017.
Aaron Saddington, "Search and Examination Report for GB Application No. GB2303448.1", Sep. 3, 2023, IPO, United Kingdom.

* cited by examiner

*Primary Examiner* — Thu N Nguyen
(74) *Attorney, Agent, or Firm* — Bridgeway IP Law Group, PLLC; Jihun Kim

(57) ABSTRACT

Proposed is a decentralized identity technique, and more specifically, are a hierarchical universal resolver system for a decentralized identifier environment and a method thereof, which can control access to connected decentralized ledger information and prevent exposure and leakage of the information by hierarchically managing a universal resolver (UR) in an identity verification system based on self-sovereign decentralized identifiers (DID). According to an embodiment, accessibility to private information in a blockchain network in which decentralized ledgers are stored, as well as privacy of certificate or identification information based on decentralized identifiers, may be complemented.

7 Claims, 16 Drawing Sheets

| Number | Function | API name | Input | Output | RESful I/F | Remarks |
|---|---|---|---|---|---|---|
| 1 | UR list inquiry | UR_List (GET) | | BC_Method_Name, UR_Address, Status, Register_Date, Update_Date, Code, Msg | /urlist | · Output UR information and list registered in DB |
| 2 | UR registration | UR_Register (POST) | BC_Method_Name, UR_Address, UR_Regitry UR_Revoke, UR_Refer, UR_Refer_RBC, UR_Request | BC_Method_Name, UR_Address, Status, Register_Date, Update_Date, Code, Msg | /registerur | · Register information on UR in DB |
| 3 | UR removal | UR_Delete (POST) | BC_Method_Name, UR_Address | BC_Method_Name, UR_Address, Status, Register_Date, Code, Msg | /deleteur | · Delete UR information registered in DB |
| 4 | UR status change (Activate) | UR_Active (POST) | BC_Method_Name, UR_Address | BC_Method_Name, UR_Address, Status, Register_Date, Code, Msg | /activeur | · Change status flag of UR registered in DB to active · Status flag is inactive state when UR is registered |
| 5 | UR status change (Deactivate) | UR_Deactive (POST) | BC_Method_Name, UR_Address | BC_Method_Name, UR_Address, Status, Register_Date, Code, Msg | /deactiveur | · Change status flag of UR registered in DB to active · Status flag is inactive state when UR is registered |
| 6 | UR information update | UR_Update (POST) | BC_Method_Name, UR_Address | BC_Method_Name, UR_Address, Status, Register_Date, Code, Msg | /updateur | · Compare existing status of UR registered in DB with changed current status (status flag), and transfer information on change to UR server through API |

FIG. 4

{ method-name : B/C ADDR } Mapping table

```
BCMap := map[string]*UR

Type UR struct {
   title      string //sub UR's name
   status     int    //status :=Activated = 2(ture)/Deactivated=3(false)
   addr       string //sub UR=s IP:PORT
   url_refer      string
   url_revoke     string
   url_registry   string
   url_request    string
   url_referrbc   string
}
```

FIG. 5

| ⊗ UR registration list | HOME > UR registration list |
|---|---|
| ⟳ UR status change | UR registration list |
| ⇆ Information update | |

UR InformationList

⊞ Register    ◇View in detail    ⊟Remove

| ☐ | No | UR Name | UR ADDR | Status | Register Date | Update Date |
|---|----|---------|---------|--------|---------------|-------------|
| ☐ | 1 | k4schain | 192.168.120.101.4200 | Activate | 2022-04-05 16:18:21 | 2022-04-05 17:13:48 |
| ☐ | 2 | test123 | 1.2.3.1 | DeActivate | 2022-03-30 17:54:38 | — |
| ☐ | 3 | test4 | 1.2.3.4 | Activate | 2022-03-30 17:37:18 | 2022-03-30 17:39:25 |
| ☐ | 4 | kscirc | 192.168.20.110.9000 | Activate | 2022-02-17 09:20:55 | 2022-03-30 17:48:32 |
| ☐ | 5 | test3 | 1.1.1.3 | DeActivate | 2022-02-11 14:55:17 | 2022-03-25 08:35:26 |
| ☐ | 6 | test2 | 1.1.1.2 | Activate | 2022-02-03 17:24:30 | 2022-02-07 11:03:47 |

| | |
|---|---|
| Register | ✕ |
| UR Name | k4schain |
| UR Address | 192.xxx.xxx.xxx:6000 |
| UR Registry | /regsitry |
| UR Revoke | /revoke |
| UR Request | /request |
| UR Refer DBC | /referdid |
| UR Refer RBC | /refrlid |

Confirm   Cancel

FIG. 14

| | | HOME > UR status change | | | | |
|---|---|---|---|---|---|---|
| ⬢ UR registration list | | UR status change | | | | |
| ⟳ UR status change | | DeActivate   Activate | | | | ✍Deactivate |
| ✎ Information update | | | | | | |
| | | ☐ No | UR Name | UR ADDR | Status | Register Date | Update Date |
| | | ☐ 1 | tset4 | 1.2.3.4 | Activate | 2022-04-05 16:18:21 | 2022-03-30 17:37:18 |
| | | ☐ 2 | kscirc | 192.168.20.110.9000 | Activate | 2022-03-30 17:54:38 | 2022-02-17 09:20:55 |
| | | ☐ 3 | test2 | 1.1.1.2 | Activate | 2022-03-30 17:37:18 | 2022-02-03 17:24:30 |
| | | ☐ 4 | test1 | 1.1.1.1 | Activate | 2022-02-17 09:20:55 | 2022-02-03 16:22:12 |
| | | | | | | | << < 1 > >> |

HIERARCHICAL UNIVERSAL RESOLVER SYSTEM FOR DECENTRALIZED IDENTITY ENVIRONMENT AND METHOD THEREOF

BACKGROUND OF THE INVENTION

Field of the Invention

The present invention relates to a decentralized identity technique, and more specifically, to a hierarchical universal resolver system for a decentralized identifier environment and a method thereof, which can control access to connected decentralized ledger information and prevent exposure and leakage of the information by hierarchically managing a universal resolver (UR) in an identity verification system based on self-sovereign decentralized identifiers (DID).

Background of the Related Art

In a decentralized identity system, a universal resolver (UR) provides standard operations in company with the functions of a service layer, and performs a technical function for linking a function required from a blockchain network to perform a corresponding standard operation. That is, the universal resolver (UR) is a server that provides a standard method of inquiring and resolving a decentralized identifier and returns a DID document object (DDO) for encapsulating DPKI metadata connected to the decentralized identifier in a system implemented and decentralized using driver collection of decentralized identifiers. The universal resolver may establish, perform, and execute a global standard compatibility method between the platforms proposed by the Decentralized Identity Foundation (DIF) of the Alliance.

However, in a heterogeneous blockchain network environment, the universal resolver is generally designed in a structure that maintains each blockchain network regardless of a service scale. In order to achieve compatibility of decentralized identifiers based on heterogeneous blockchain networks, the system should be implemented by separately using a universal resolver suitable for each blockchain network.

In addition, the blockchain network allows an unspecified number of people to access and inquire contents of blocks for verification purpose, and this may lead to data exposure and information leakage. Therefore, the universal resolver having a technical feature of linking to one blockchain network may inquire all decentralized ledgers stored without restriction in relation to the identifiers decentralized in the same blockchain network. The decentralized identity technique is a technique that is created to use a mobile employee identification card, a mobile identification card, or the like as authentication medium information for authenticating a person, and conceptually, anyone may access and confirm/verify the decentralized ledgers of the decentralized identifiers. However, in reality, it may be sensitive or inappropriate for a private company, public company, military organization, government organization, or the like to disclose information on the decentralized identifiers and decentralized ledgers used to authenticate an identity to anyone. Therefore, when an open blockchain network or the decentralized identity technique is applied to an identity card in a company, information in the decentralized ledgers is disclosed and may generate a problem of accessibility to private information, which discloses personal information. In particular, similar problems may occur in large corporations having affiliates or public institutions. In this case, since it is unable in reality to refrain subordinate affiliates of a company group from accessing information on the employee of upper or subordinate affiliates, privacy of personal information may not be maintained. In addition, circumstances contradictory to the concept of decentralized ledgers, such as frequent issuance or deletion of employee information according to the company's policy, inevitably occur.

SUMMARY OF THE INVENTION

An object of the present invention is to provide a hierarchical universal resolver system for a decentralized identifier environment and a method thereof, which can flexibly manage information according to security policies and is easy to upscale and downscale by managing a universal resolver (UR) in an integrated manner using a hierarchical universal resolver (HUR).

According to one aspect of the present invention, there is provided a hierarchical universal resolver system for a decentralized identifier environment, and a method thereof.

The hierarchical universal resolver system for a decentralized identifier environment according to an embodiment of the present invention may comprise: a decentralized storage unit for storing and providing decentralized identifiers capable of proving self-sovereign identity; a universal resolver for managing the decentralized identifier environment; and a hierarchical integration unit for managing information on one or more identifiable universal resolvers.

According to another aspect of the present invention, there is provided a method of driving a hierarchical universal resolver system for a decentralized identifier environment, and a computer program executing the method.

The method of driving a hierarchical universal resolver system for a decentralized identifier environment according to an embodiment of the present and the computer program executing the method may include the steps of: receiving a request for performing a job related to a universal resolver; performing the job using a RESTful API; and transmitting a result of performing the job.

BRIEF DESCRIPTION OF THE DRAWINGS

FIGS. 2 to 5 are views for explaining a hierarchical universal resolver system for a decentralized identifier environment according to an embodiment of the present invention.

FIGS. 13 to 16 are exemplary screens showing the user interface of a hierarchical universal resolver system for a decentralized identifier environment according to an embodiment of the present invention.

DETAILED DESCRIPTION OF THE PREFERRED EMBODIMENT

Figure 1:
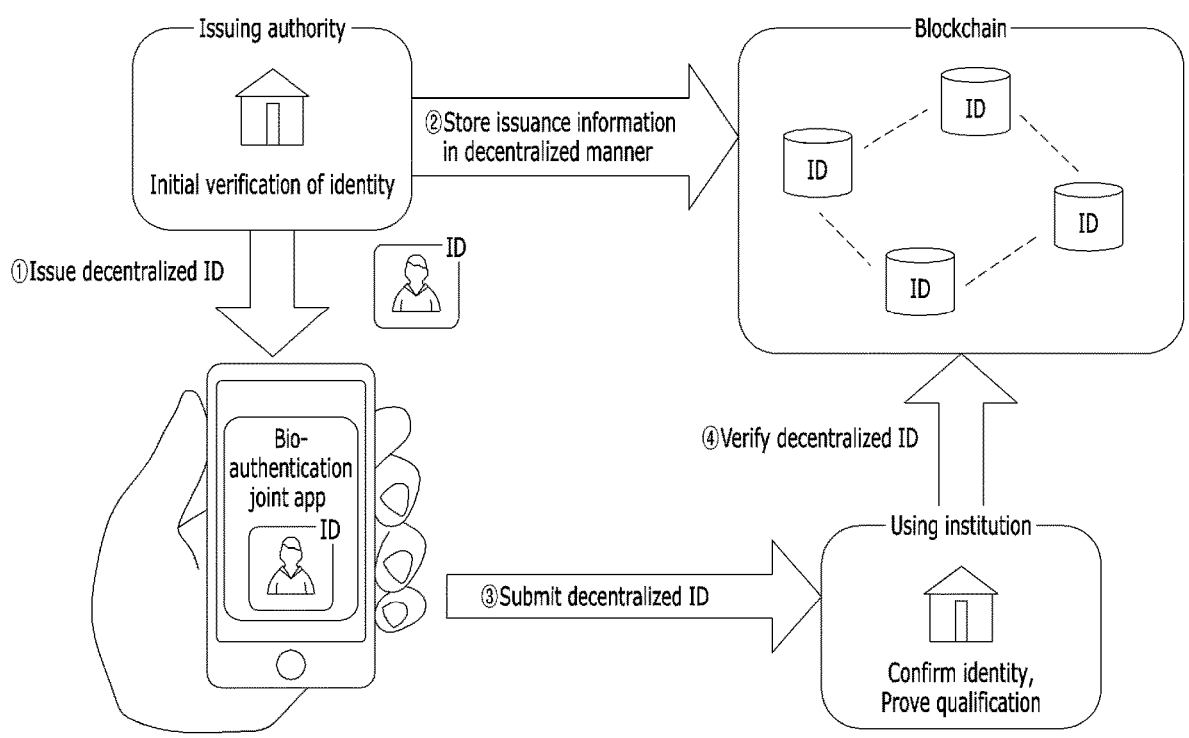
FIG. 1 is a schematic diagram showing an identity verification service using a conventional decentralized identity technique.

Since the present invention may make various changes and have various embodiments, specific embodiments will be illustrated in the drawings and described in detail through detailed description. However, it should be understood that this is not intended to limit the present invention to the specific embodiments, and includes all modifications, equivalents, and substitutes included in the spirit and scope of the present invention. In describing the present invention, when it is determined that a detailed description of related known techniques may unnecessarily obscure the subject matter of the present invention, the detailed description will be omitted. In addition, singular expressions used in this specification and claims should be interpreted to generally mean "one or more" unless stated otherwise.

Hereinafter, preferred embodiments of the present invention will be described in detail with reference to the accompanying drawings. In describing with reference to the accompanying drawings, the same reference numerals will be given the same or corresponding components, and duplicated descriptions thereof will be omitted.

FIG. 1 is a schematic diagram showing an identity verification service using a conventional decentralized identity technique.

Referring to FIG. 1, an identity verification service based on self-sovereign decentralized identifiers may store issuance information in a decentralized manner, verify an identity using the decentralized identifiers, and confirm the information stored in a decentralized manner. Due to the characteristics of blockchain, decentralized ledger information may be accessed using a universal resolver in order to verify distributed identifier documents stored in a decentralized manner. However, since accessing and confirming decentralized ledgers storing personal information leads to exposure or leakage of personal information, a privacy policy is required for the decentralized ledgers that store personal information. Particularly, when the decentralized identity system is applied as a service technique such as proof of employee or proof of identification, a circumstance that should maintain confidentiality, which is contradictory to the blockchain environment, inevitably occurs for the decentralized ledgers containing personal information.

Figure 2:
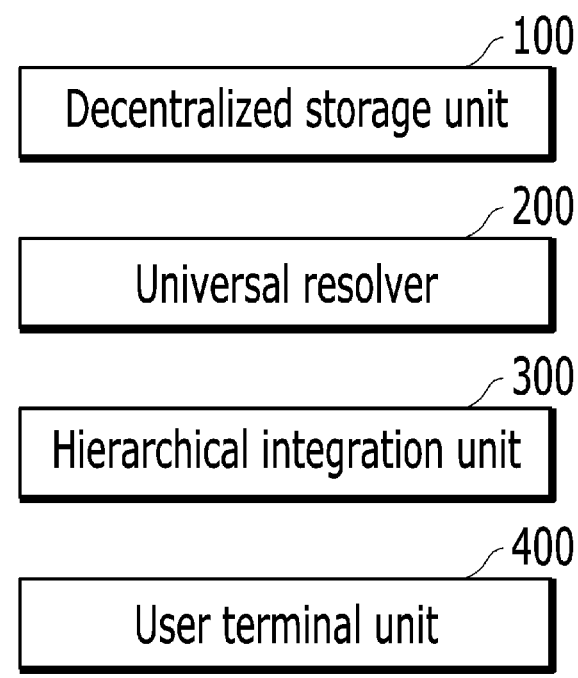
Figure 3:
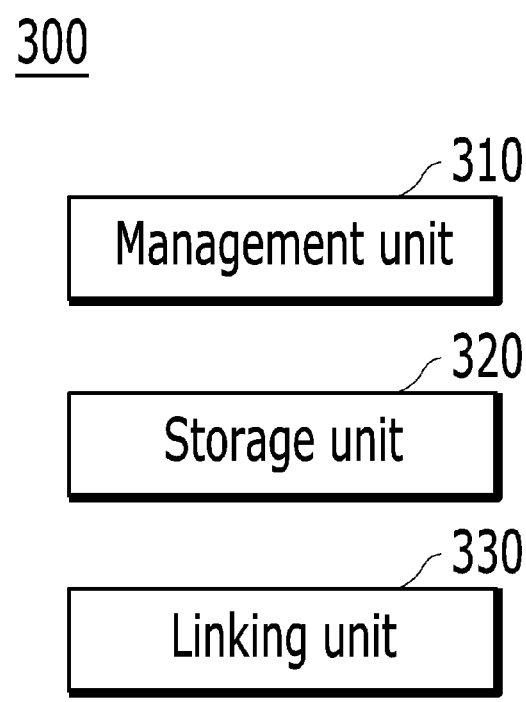

FIGS. 2 and 3 are views for explaining a hierarchical universal resolver system for a decentralized identifier environment according to an embodiment of the present invention.

Referring to FIG. 2, the hierarchical universal resolver system 10 for a decentralized identifier environment includes a decentralized storage unit 100, a universal resolver 200, a hierarchical integration unit 300, and a user terminal unit 400.

The decentralized storage unit 100 may store and manage decentralized identifiers capable of proving self-sovereign identity.

The decentralized storage unit 100 may be a blockchain that stores decentralized ledgers for a decentralized identifier environment capable of proving self-sovereign identity.

The decentralized storage unit 100 may provide a function of storing, inquiring, and the like for the decentralized identifiers through a universal resolver.

The universal resolver 200 is a universal resolver for an environment of decentralized identifiers. The universal resolver 200 may link one or more blockchains needed for a decentralized identifier environment. The universal resolver 200 is a server that returns a DID document object (DDO) for encapsulating DPKI meta data connected to a decentralized identifier, which provides a standard method for inquiring and resolving a decentralized identifier. Generally, the universal resolver has a technical feature of linking one blockchain.

Referring to FIG. 3, the hierarchical integration unit 300 may include a management unit 310, a storage unit 320, and a linking unit 330.

The hierarchical integration unit 300 may manage information on one or more identifiable universal resolvers 200.

As the hierarchical integration unit 300 manages information on one or more identifiable universal resolvers 200 in an integrated manner and provides an integrated interface, interoperability among different universal resolvers 200 is guaranteed, and the universal resolvers may be executed independently.

The management unit 310 may hierarchically manage information on one or more identifiable universal resolvers 200, and control access to the decentralized storage unit 100 through the universal resolver 200. For example, the management unit 310 may control activation or deactivation status information of the universal resolver 200 for access to a blockchain system for a decentralized identifier environment. The management unit 310 may control the blockchain access right by managing information on the universal resolver 200.

The management unit 310 may perform inquiry, registration, removal, status change, and update of information on one or more universal resolvers 200. The management unit 310 may manage one or more universal resolvers 200 in a hierarchical structure.

The management unit 310 may flexibly manage upscaling and downscaling of the universal resolver 200 by changing the status information of the universal resolver 200 through an API. In addition, the management unit 310 may rapidly reflect changed policies using the status information of the universal resolver 200. The management unit 310 may solve the problem of confidentiality by applying the policies. For example, when a company or a public institution uses an identification card or employee identification card system based on decentralized identifiers as the decentralized storage unit 100, the decentralized storage unit 100 may be accessed through the universal resolver 200, and anyone may access information on the decentralized ledgers. In this case, the management unit 310 may control access of subordinate affiliates of the same company group to employee information of upper- or same-level affiliates, and may solve the problem of frequently generating or deleting employee information according to the policy of a corresponding affiliate. The management unit 310 may control access to the decentralized storage unit 100 according to the policy by managing information of the universal resolver 200.

FIG. 4 is view showing an example of APIs provided for the management unit 310 to perform functions.

Referring to FIG. 4, the management unit 310 may provide functions of inquiring a universal resolver list, registering a universal resolver, removing a universal resolver, changing universal resolver status to activation, changing universal resolver status to deactivation, and updating universal resolver information through a RESTful API.

The management unit 310 may output information on and a list of one or more universal resolvers 200 registered in the storage unit 320 using the function of inquiring a universal resolver list.

The management unit 310 may register information on the universal resolver in the storage unit 320 using the function of registering a universal resolver.

The management unit 310 may remove information on the universal resolver from the storage unit 320 using the function of removing a universal resolver. For example, the management unit 310 may remove information on a universal resolver that is physically removed or not needed any more. The universal resolver 200 whose information has been removed may not access the decentralized storage unit any more.

The management unit 310 may store information on one or more universal resolvers 200 in the storage unit 320 and manage the information as needed.

Referring to FIG. 3 again, the storage unit 320 may store and manage a table containing information on one or more universal resolvers 200. In addition, the storage unit 320 may store and manage details and logs of using information on the universal resolver 200. For example, the storage unit 320 may use a relational database system as the storage unit.

[Table 1] shows an example of a universal resolver information table of a relational database managed by the storage unit 320.

| Names | Examples | Description |
| --- | --- | --- |
| id | 1 | |
| title | kschain | B/C Method Name, Name for identifying blockchain |
| addr | 192.168.20.110:9000 | Address and port of universal resolver |
| url_registry | /registry | URL of API for requesting registration of decentralized identifier for linked universal resolver |
| url_revoke | /revoke | URL of API for requesting revocation of decentralized identifier for linked universal resolver |
| url_refer | /refer | URL of API for requesting inquiry of decentralized identifier for linked universal resolver |
| url_request | /request | URL of API for requesting information on decentralized identifier for linked universal resolver |
| url_referrbc | /rbc | URL of API for requesting inquiry of revoked decentralized identifier for linked universal resolver |
| status | 3 | Status of registered current universal resolver (2: Active, 3: Inactive) |
| status_flag | 3 | Request status of registered current universal resolver (2: Active, 3: Inactive) |
| reg_date | 2022-02-16 12:00:00 | Registered date of universal resolver |
| mod_date | — | Updated date of universal resolver |

The management unit 310 may change the status of the universal resolver registered in the storage unit 320 to an active state using the function of changing universal resolver status to activation. For example, the management unit 310 may set the status information of the universal resolver 200 to an inactive state when the universal resolver is registered, and to an active state when the universal resolver is used. The management unit 310 may change the status information of the universal resolver 200 registered in the storage unit 3200 to an inactive state using the function of changing universal resolver status to deactivation. The management unit 310 may manage upscaling and downscaling of one or more universal resolvers 200 by reflecting the status information of the universal resolver 200, which is changed using the function of updating universal resolver information, to the universal resolver information.

FIG. 5 is a view showing an example of a code directly and actually reflecting status information of the universal resolver as the management unit 310 executes the function of updating universal resolver information.

The storage unit 320 may store and manage information on the universal resolver 200 classified into title, addr, url_registry, url_revoke, url_refer, url_request, url_referrbc, status, status_flag, reg_date, mod_date, and the like.

The linking unit 330 may inquire and manage decentralized identifier information stored in the decentralized storage unit 100 through the universal resolver 200.

The linking unit 330 may receive a request for executing a function of the registered universal resolver 200 and execute a command.

The linking unit 330 may link the functions of registering a decentralized identifier (DID), inquiring and revoking a stored decentralized identifier (DID), and requesting a decentralized identifier (DID) document to the distributed storage 100 through an identifiable universal resolver 200.

The linking unit 330 receives an identification value of an identifiable universal resolver 200 and request data needed for linking each function. The linking unit 330 may link a request function for the identifiable universal resolver 200. At this point, the linking unit 330 determines that the request is valid only for the universal resolver 200 in the registered and active state through the management unit 310 and performs a linking function for the request.

Referring to FIG. 2 again, the user terminal unit 400 may request inquiry, registration, removal, status change, and update of information on the universal resolver 200 through a user interface provided by the hierarchical integration unit 300.

The user terminal unit 400 may link the functions of the universal resolver 200 such as registration of a decentralized identifier (DID), inquiry and revocation of a stored decentralized identifier (DID), request of a decentralized identifier (DID) document, and the like through a user interface provided by the hierarchical integration unit 300.

Figure 6:
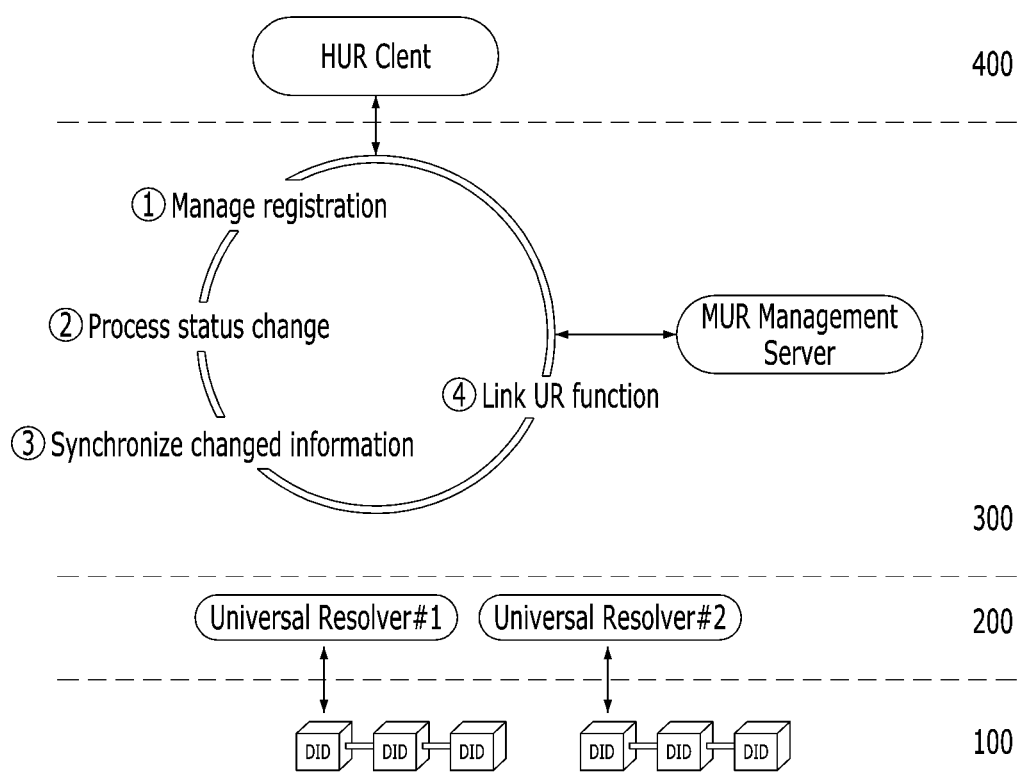
FIGS. 6 and 7 are exemplary views showing the configuration of a hierarchical universal resolver system according to an embodiment of the present invention.
Figure 7:
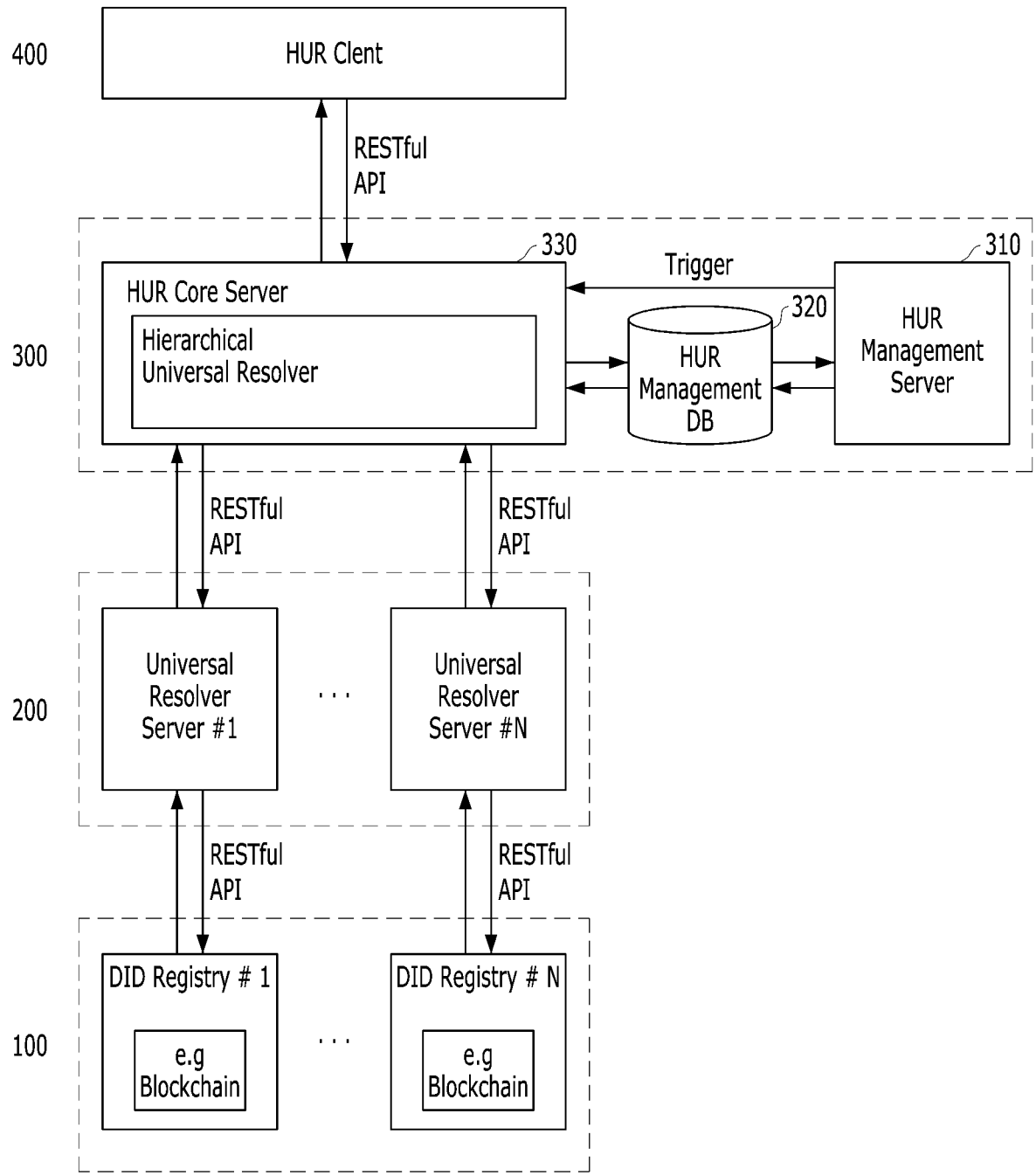

FIGS. 6 and 7 are exemplary views showing the configuration of a hierarchical universal resolver system according to an embodiment of the present invention.

Referring to FIGS. 6 and 7, the hierarchical universal resolver system 10 for a decentralized identifier environment may manage one or more universal resolvers 200 to be identified.

The hierarchical universal resolver system 10 for a decentralized identifier environment may manage information on the universal resolver 200 through a user interface provided by the multi-layer integration unit 300. The hierarchical universal resolver system 10 may perform registration, removal, inquiry, status change, and update of information on the universal resolver 200 stored in the relational database using a RESTful API.

The hierarchical universal resolver system 10 for a decentralized identifier environment may update the status of the universal resolver 200 through an API on the basis of information on the universal resolver 200 stored in the relational database.

The hierarchical universal resolver system 10 for a decentralized identifier environment may control the status information of the universal resolver 200, and link the functions of the universal resolver 200.

Figure 8:
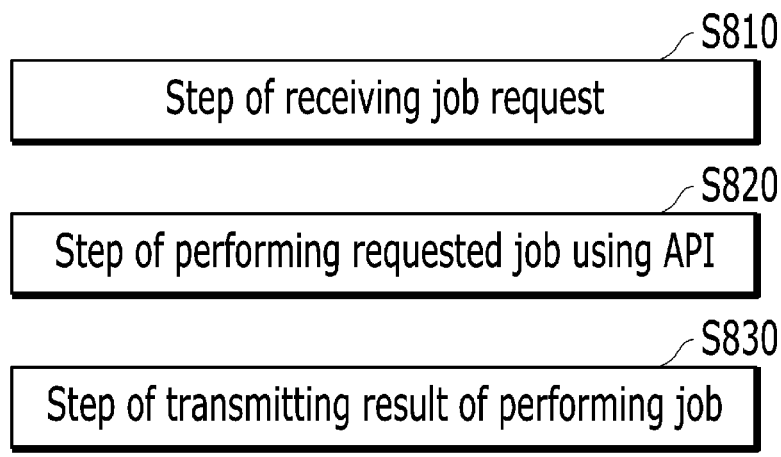
FIG. 8 is a view briefly showing a method of driving a hierarchical universal resolver system for a decentralized identifier environment according to an embodiment of the present invention.

FIG. 8 is a view briefly showing a method of driving a hierarchical universal resolver system for a decentralized identifier environment according to an embodiment of the present invention. Although the process described below is a process performed at each step by each functional unit constituting the hierarchical universal resolver system for a decentralized identifier environment, the subject of each step is generally referred to as a hierarchical universal resolver system for a decentralized identifier environment for the sake of concise and clear description of the present invention.

Referring to FIG. 8, at step S810, the hierarchical universal resolver system 10 for a decentralized identifier environment receives a request for performing a job related to the universal resolver. For example, the hierarchical universal resolver system 10 for a decentralized identifier environment may receive a job request from a user.

At step S820, the hierarchical universal resolver system 10 for a decentralized identifier environment performs the requested job using a RESTful API. The management unit 310 may provide functions of inquiring a universal resolver list, registering a universal resolver, removing a universal resolver, changing universal resolver status to activation, changing universal resolver status to deactivation, and updating universal resolver information through a RESTful API.

At step S830, the hierarchical universal resolver system 10 for a decentralized identifier environment transfers a result of performing the requested job to the requesting user.

FIGS. 9 to 12 are exemplary views briefly showing the protocol flow of a hierarchical universal resolver system for a decentralized identifier environment according to an embodiment of the present invention.

Figure 9:
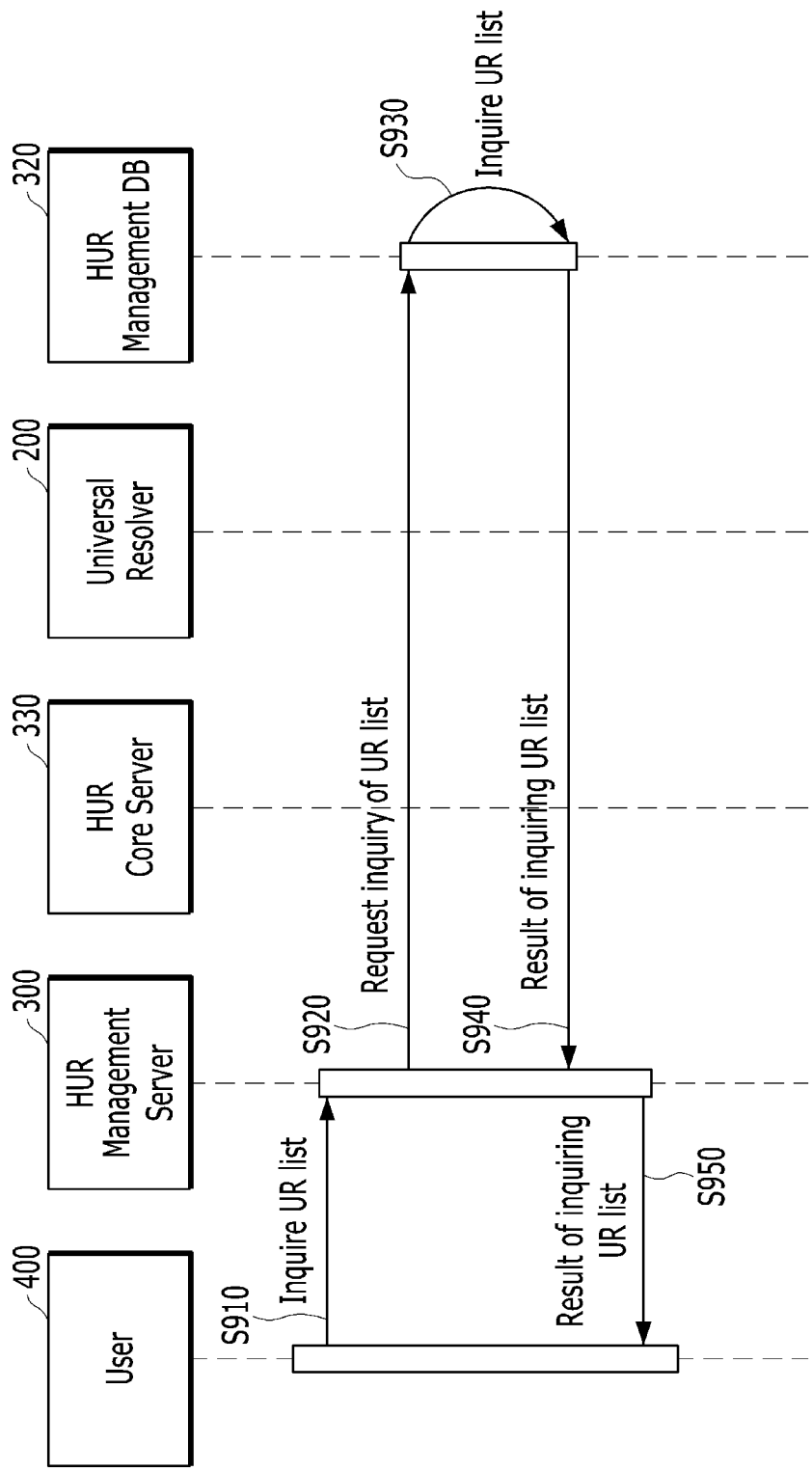
FIGS. 9 to 12 are exemplary views briefly showing the protocol flow of a hierarchical universal resolver system for a decentralized identifier environment according to an embodiment of the present invention.

Referring to FIG. 9, at step S910, the hierarchical universal resolver system 10 for a decentralized identifier environment receives a request for querying a universal resolvers list.

At step S920, the hierarchical universal resolver system 10 for a decentralized identifier environment requests inquiry of a universal resolver list stored in the storage unit 320 using a universal resolver list inquiry API.

At step S930, the hierarchical universal resolver system 10 for a decentralized identifier environment inquires a list of universal resolvers 200 stored in the storage unit 320.

At step S940, the hierarchical universal resolver system 10 for a decentralized identifier environment transmits a result of inquiring a universal resolver list to the management unit 310.

At step S950, the hierarchical universal resolver system 10 for a decentralized identifier environment transmits a result of inquiring a universal resolver list to the user who has requested the universal resolver list.

Figure 10:
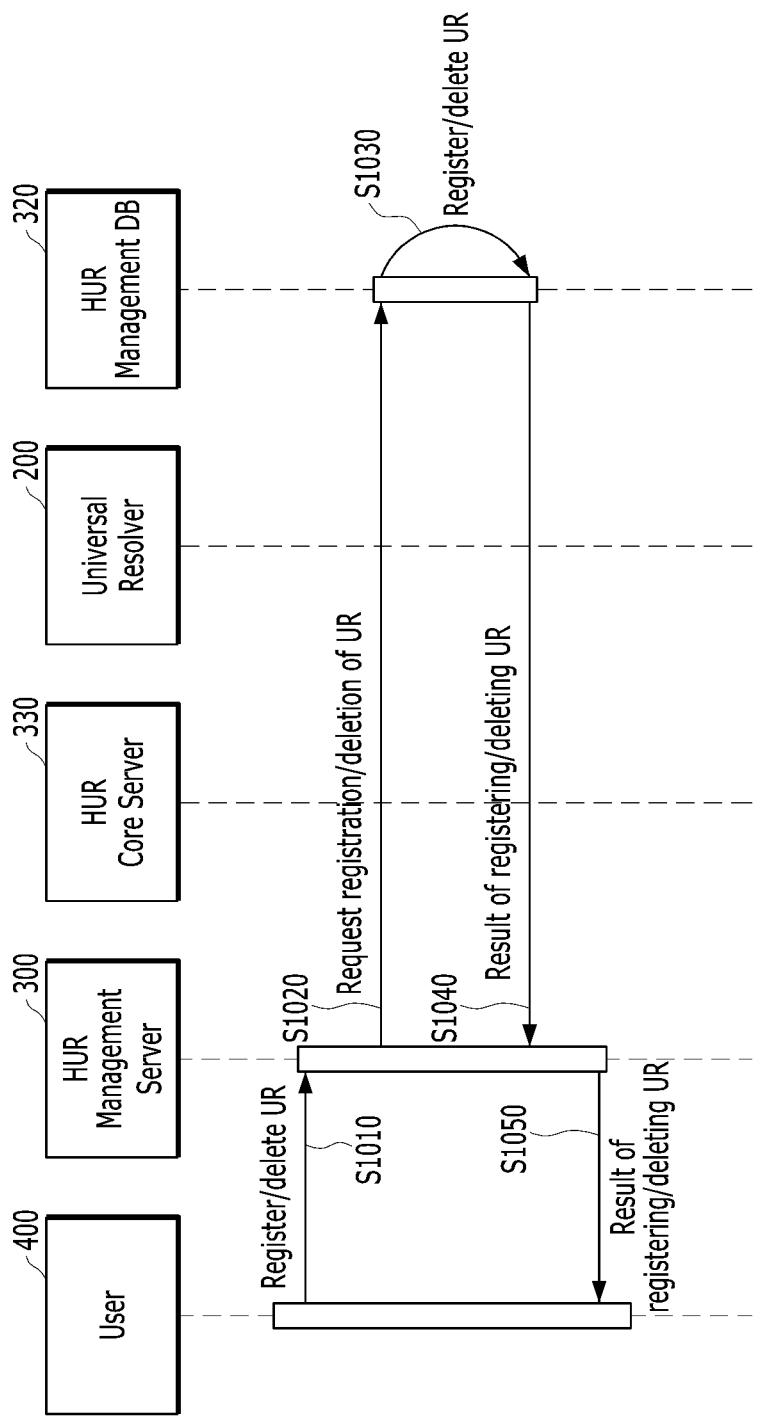

Referring to FIG. 10, at step S1010, the hierarchical universal resolver system 10 for a decentralized identifier environment receives a request for registering or removing information on a universal resolver.

At step S1020, the hierarchical universal resolver system 10 for a decentralized identifier environment transmits a registration request using a universal resolver registration API or transmits a removal request using a universal resolver removal API.

At step S1030, the hierarchical universal resolver system 10 for a decentralized identifier environment registers or removes information on the universal resolver in or from the storage unit 320.

At step S1040, the hierarchical universal resolver system 10 for a decentralized identifier environment transmits a result of registering or removing information on the universal resolver.

At step S1050, the hierarchical universal resolver system 10 for a decentralized identifier environment transmits a result of registering or removing a universal resolver to the user who has requested registration or removal of the universal resolver.

Figure 11:
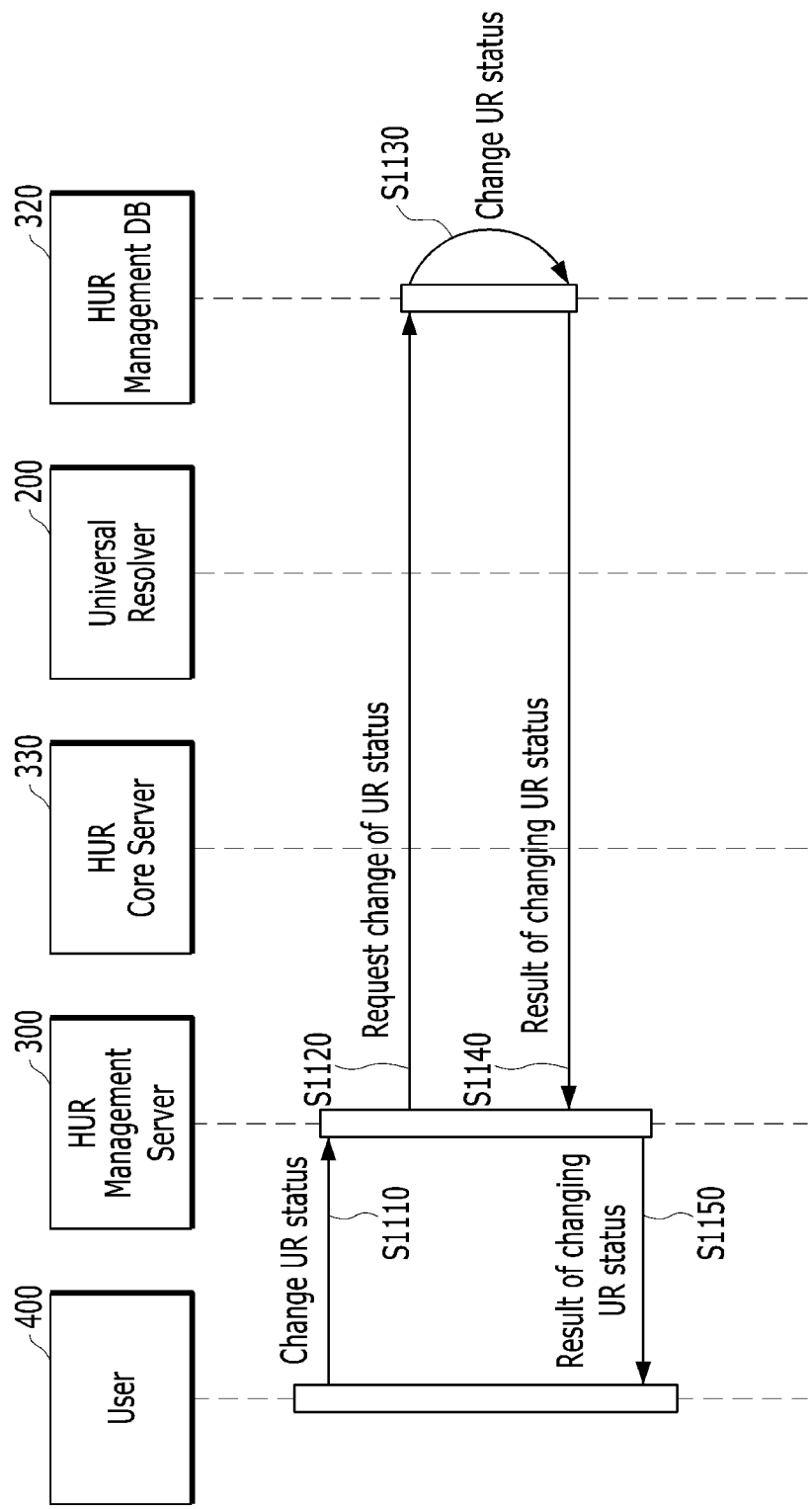

Referring to FIG. 11, at step S1110, the hierarchical universal resolver system 10 for a decentralized identifier environment receives a request for changing the active or inactive state of the universal resolver.

At step S1120, the hierarchical universal resolver system 10 for a decentralized identifier environment requests a change to an active state using a universal resolver activation API, or requests a change to an inactive state using a universal resolver deactivation API.

At step S1130, the hierarchical universal resolver system 10 for a decentralized identifier environment changes the status information of the universal resolver to an active state or an inactive state in the storage unit 320.

At step S1140, the hierarchical universal resolver system 10 for a decentralized identifier environment transmits a result of activating or deactivating the status of the universal resolver.

At step S1150, the hierarchical universal resolver system 10 for a decentralized identifier environment transmits a result of activating or deactivating the universal resolver to the user who has requested activation or deactivation of the universal resolver.

Figure 12:
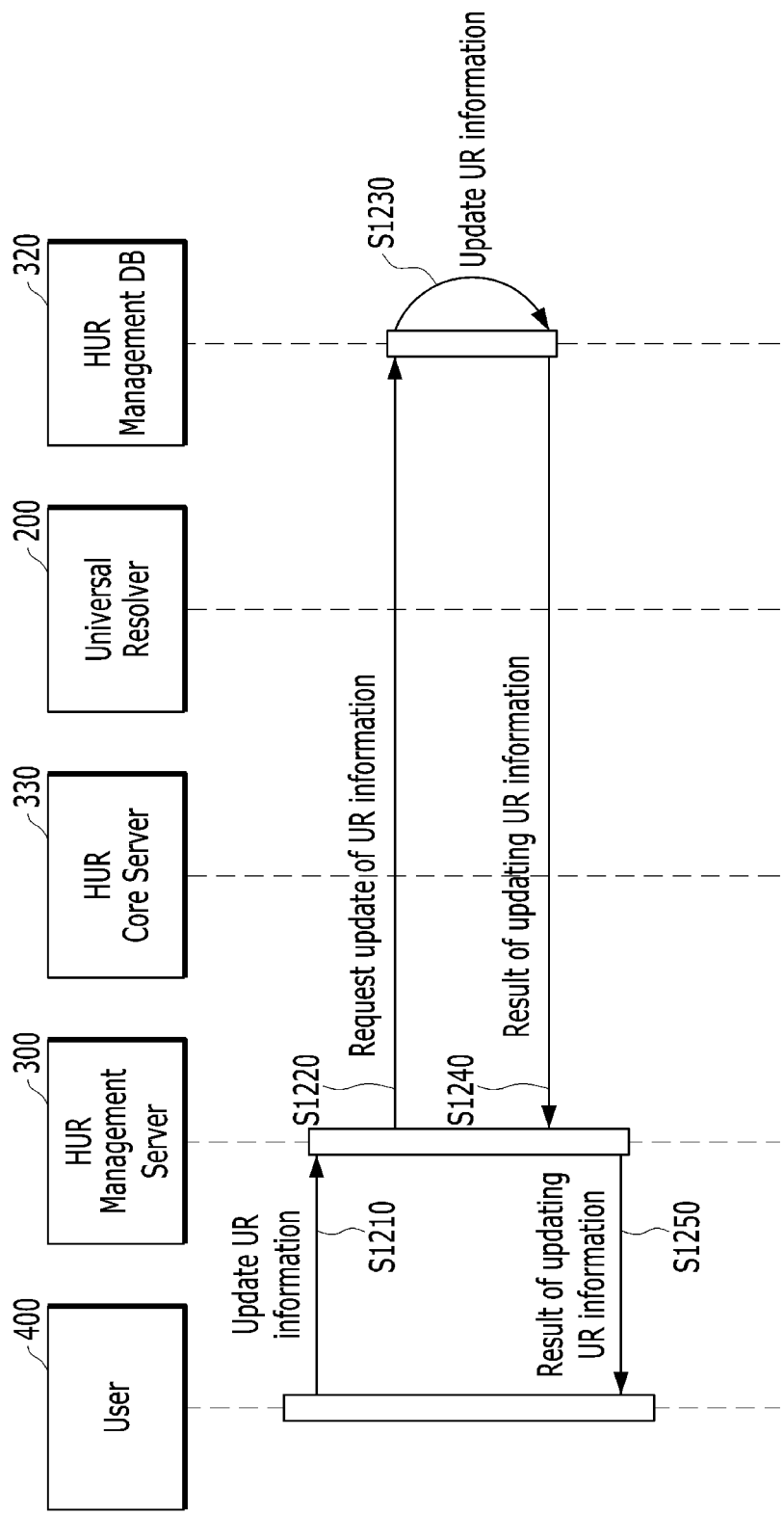

Referring to FIG. 12, at step S1210, the hierarchical universal resolver system 10 for a decentralized identifier environment receives a request for updating information on the universal resolver.

At step S1220, the hierarchical universal resolver system 10 for a decentralized identifier environment transmits a request for updating information using a universal resolver information update API.

At step S1230, the hierarchical universal resolver system 10 for a decentralized identifier environment updates status information of the universal resolver in the storage unit 320.

At step S1240, the hierarchical universal resolver system 10 for a decentralized identifier environment transmits a result of updating information on the universal resolver.

At step S1250, the hierarchical universal resolver system 10 for a decentralized identifier environment transmits a result of updating the status information of the universal resolver to the user who has requested update of the status information of the universal resolver.

FIGS. 13 to 16 are exemplary screens showing the user interface of a hierarchical universal resolver system for a decentralized identifier environment according to an embodiment of the present invention.

FIG. 13 is an example of a screen showing a list of one or more identifiable registered universal resolvers 200.

Referring to FIG. 13, in the hierarchical universal resolver system 10 for a decentralized identifier environment, it is possible to view information on universal resolvers 200 in detail and remove the information from the list of universal resolvers 200.

FIG. 14 shows an example of an input screen for registering information on a universal resolver 200 in the hierarchical universal resolver system 10 for a decentralized identifier environment.

FIG. 15 shows an example of a screen for inquiring and changing the status of a universal resolver 200 in the hierarchical universal resolver system 10 for a decentralized identifier environment. The hierarchical universal resolver system 10 for a decentralized identifier environment may select an activated identifiable universal resolver 200 and change information to an inactive (DeActivate) state.

Figure 16:
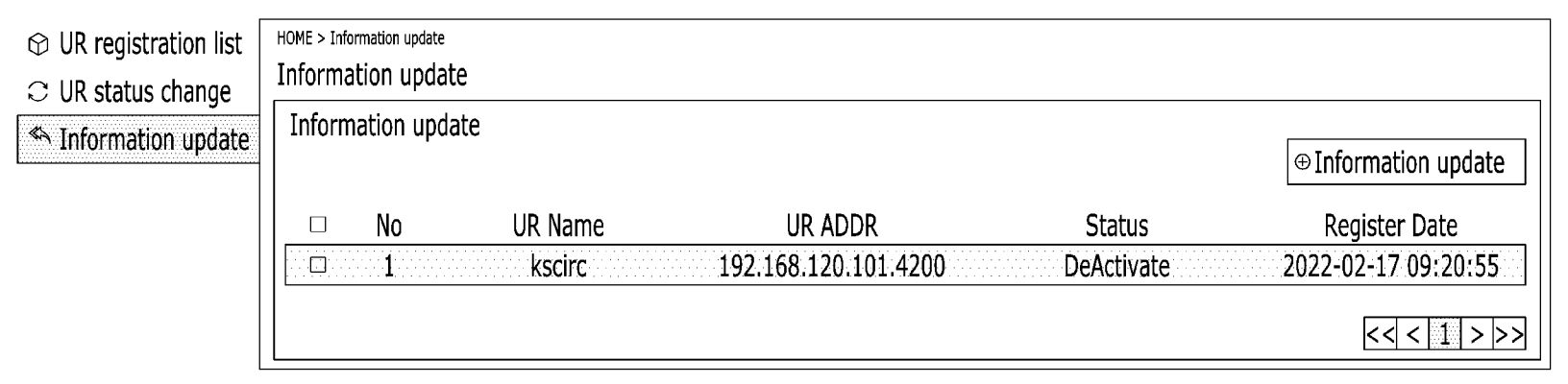

FIG. 16 shows an example of a screen for updating information after changing the status of a universal resolver 200 in the hierarchical universal resolver system 10 for a decentralized identifier environment. The hierarchical universal resolver system 10 for a decentralized identifier environment may implement activation or deactivation of the universal resolver 200 by updating information in the storage unit 320. Since a deactivated universal resolver 200 is invalid, the decentralized storage unit 100 may not be accessed through the universal resolver 200 in the hierarchical universal resolver system 10 for a decentralized identifier environment.

The method of driving the hierarchical universal resolver system 10 for a decentralized identifier environment described above may be implemented as computer-readable code on a computer-readable medium. The computer-readable recording medium may be, for example, a portable recording medium (CD, DVD, Blu-ray disc, USB storage device, removable hard disk) or a fixed recording medium (ROM, RAM, computer-equipped hard disk). The computer program recorded on the computer-readable recording medium may be transmitted to another computing device through a network such as the Internet or the like, installed in another computing device, and used in another computing device.

According to an embodiment of the present invention, accessibility to private information in a blockchain network in which decentralized ledgers are stored, as well as privacy of certificate or identification information based on decentralized identifiers, may be complemented.

In addition, according to an embodiment of the present invention, as a universal resolver is managed, access to information may be controlled by applying confidentiality issues of decentralized ledgers according to a policy, and it is possible to quickly respond to issuance or deletion.

In addition, according to an embodiment of the present invention, as a universal resolver may be added and removed as needed, upscaling and maintenance of the system may be facilitated.

In addition, according to an embodiment of the present invention, various universal resolvers may be identified by managing information on the universal resolvers in an integrated manner, and interoperability among different universal resolvers may be guaranteed by providing an integrated management interface.

As described above, all the components constituting the embodiment of the present invention have been described as being combined into one or integrally operating, but the present invention is not necessarily limited to these embodiments. That is, within the scope of the object of the present invention, all the components may be selectively combined into one or more to operate.

Although operations are shown in a particular order in the drawings, it should not be understood that the operations should be performed in the shown particular order or in a sequential order, or that all the shown operations should be performed to obtain a desired result. In a certain circumstance, multitasking and parallel processing may be advantageous. Moreover, separation of the various components in the embodiments described above should not be understood as being required, and it should be understood that the described program components and systems may generally be integrated together into a single software product or packaged into a plurality of software products.

Until now, the present invention has been described focusing on the embodiments. Those skilled in the art will understand that the present invention can be implemented in a modified form without departing from the essential characteristics of the present invention. Therefore, the disclosed embodiments should be considered from an illustrative viewpoint, rather than a restrictive viewpoint. The scope of the present invention is shown in the claims rather than the above description, and all the differences within a range equivalent thereto should be construed as being included in the present invention.

DESCRIPTION OF SYMBOLS

10: Hierarchical universal resolver system for decentralized identity environment
100: Decentralized storage unit
200: Universal resolver
300: Hierarchical integration unit
310: Management unit
320: Storage unit
330: Linking unit
400: User terminal unit

What is claimed is:

1. A hierarchical universal resolver system for a decentralized identifier environment, the system comprising:
a decentralized storage unit for storing and providing decentralized identifiers capable of proving self-sovereign identity;
a universal resolver for managing the decentralized identifier environment; and
a hierarchical integration unit for managing information of a plurality of identifiable universal resolvers,
wherein the hierarchical integration unit includes a management unit for managing status of the universal resolvers, a storage unit for storing information of the universal resolvers, and a linking unit for linking functions of the universal resolvers,
wherein the hierarchical integration unit is configured to manage information of the universal resolvers in an integrated manner and to provide an integrated interface to allow an interoperability between different universal resolvers and enabling independent execution of the universal resolvers, and
wherein the management unit is configured to manage upscaling and downscaling of the universal resolvers by changing, through an application programming interface (API), activation or deactivation status information of the universal resolvers for accessing a blockchain system for the decentralized identifier environment and to reflect changed policies using the status information of the universal resolvers.

2. The system according to claim 1, wherein the hierarchical integration unit provides a user interface and the API.

3. The system according to claim 1, wherein the hierarchical integration unit manages the plurality of identifiable universal resolvers in a hierarchical structure.

4. The system according to claim 1, wherein the storage unit stores information of the universal resolvers in a relational database.

5. The system according to claim 1, wherein the management unit includes functions of the universal resolvers, such as list inquiry, registration, removal, status change, or information update.

6. A method of driving a hierarchical universal resolver system for a decentralized identifier environment, the method comprising:
storing and providing, using a decentralized storage unit, decentralized identifiers capable of proving self-sovereign identity;
managing, using a universal resolver, the decentralized identifier environment; and
managing, using a hierarchical integration unit, information of a plurality of identifiable universal resolvers,
wherein the hierarchical integration unit includes a management unit for managing status of the universal resolvers, a storage unit for storing information of the universal resolvers, and a linking unit for linking functions of the universal resolvers,
wherein the hierarchical integration unit is configured to manage information of the universal resolvers in an integrated manner and to provide an integrated interface to allow an interoperability between different universal resolvers and enabling independent execution of the universal resolvers, and
wherein the management unit is configured to manage upscaling and downscaling of the universal resolvers by changing, through an application programming interface (API), activation or deactivation status information of the universal resolvers for accessing a blockchain system for the decentralized identifier environment and to reflect changed policies using the status information of the universal resolvers.

7. The method according to claim 6, wherein the API includes functions of the universal resolver, such as list inquiry, registration, removal, status change, or information update.

* * * * *